Patented Dec. 29, 1925.

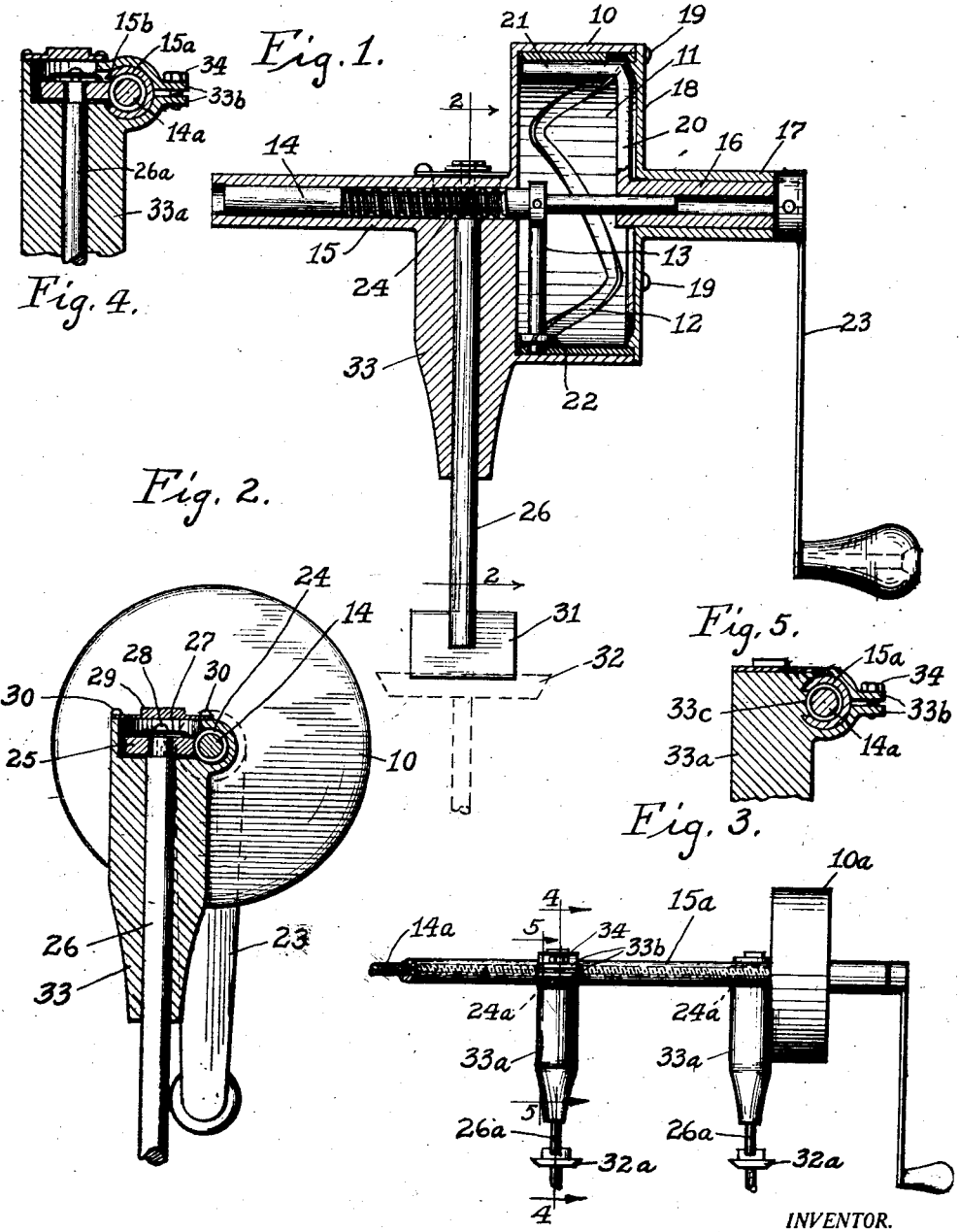

1,567,782

UNITED STATES PATENT OFFICE.

HARRY A. BERN, OF CHICAGO, ILLINOIS.

VALVE GRINDER.

Application filed April 19, 1921. Serial No. 462,512.

*To all whom it may concern:*

Be it known that I, HARRY A. BERN, a citizen of the United States, residing at Chicago, in the county of Cook and State of Illinois, have invented a new and useful Improvement in Valve Grinders, of which the following is a specification.

My invention relates to an improved form of valve grinder for grinding valves of internal combustion engines without removing the valves from their seats. My invention involves mechanism for imparting to the valves an oscillatory motion, the amount of motion in one direction being greater than the other as a result of which the valve in addition to being oscillated is progressively advanced or rotated a certain amount in the same direction with each cycle of oscillation; furthermore I accomplish this in my improved construction by using driving devices which are always in mesh, the oscillating motion being secured by a cam construction to impart the resultant rotary and oscillating motion to the operating rod for a continuous and uniform rotation of the operating handle. In this manner I avoid the difficulties heretofore incident to devices of this kind in which the operation has been secured by mutilated gears which are part of the time out of mesh. My invention also provides a construction for imparting a yielding driving effort so that if for any reason the valve spindle becomes jammed or stuck no undue shock will be imparted to it or to the grinding mechanism.

My invention will best be understood by reference to the accompanying drawings showing a preferred embodiment thereof in which—

Fig. 1 shows my device in longitudinal, central, vertical, sectional view,

Fig. 2 is a sectional view of the parts shown in Fig. 1 taken along the line 2—2, Fig. 3, shows in side elevation a modified construction of my device for simultaneously grinding a plurality of valves, and Figs. 4 and 5 are sectional views of the parts shown in Fig. 3 taken along the lines 4—4 and 5—5.

Similar numerals refer to similar parts throughout the several views.

As shown in Figs. 1 and 2 my device consists of a cylindrical housing 10, the inner cylindrical surface of which carries a cam element 11 provided with a continuous cam groove 12, in which groove the end of an arm 13 rigidly secured to a shaft 14, engages. The shaft 14 is supported at one of its ends in a stationary sleeve 15 projecting from the housing and at its other end it is supported in a rotary sleeve 16 mounted for rotation in a stationary sleeve 17 projecting from the cover plate 18 of the housing 10. The cover plate 18 is preferably held in place on the housing by screws 19 as indicated. The sleeve 16 has rigidly secured thereto a radial arm 20 from the outer end of which a driving arm 21 projects parallel with the shaft 14 just inside of the cam member 11 to engage the roller 22 carried by the arm 13 just inside of said cam member. The arms 21 and 13 constitute first and second arms or members respectively involved in the driving operation. The right hand end of the shaft 14 for the relation of parts shown in Fig. 1, is a sliding fit in the sleeve 16 and arm 20 secured thereto. The sleeve 16 has rigidly secured to its outer end, a crank 23 by which the sleeve 16 and arm 20 may be rotated and thus rotate the arm 13 and impart to the shaft 14 a rotary motion. At the same time, as a result of the engagement between the outer end of the arm 13 and the cam slot 12, the shaft 14 has imparted to it a reciprocating motion.

The shaft 14 has formed thereon a thread or worm 24 which as shown in Fig. 2 meshes with a worm wheel 25 loosely mounted on the upper end of the driving spindle 26. The worm wheel 25 is held in frictional engagement with the spindle 26 by means of a spring disk 27 held against said worm wheel by a screw 28 carried by the upper end of the spindle 26. Any desired degree of frictional engagement may be secured by properly proportioning the disk 27 and by proper adjustment of the screw 28. A cap 29 is employed to cover the recess containing the worm wheel 25, said cap being held in place by suitable screws 30 as indicated. The lower end of the spindle 26 carries a blade 31 for engaging the slots usually formed in the exposed faces of the valves to be ground as indicated in dotted lines at 32.

As a result of the construction described it will appear that when the crank 23 is rotated at a uniform rate with the blade 31 in engagement with a valve to be ground, the engagement between the worm 24 and the worm wheel 25 tends to impart rotation always in the same direction to the spindle 26. At the same time however the reciprocation of the shaft 14 produced by the cam slot 12 imparts an oscillatory motion to the spindle 26, the action between the worm 24 and worm wheel 25 for this part of the operation being substantially that of a rack and gear. In this manner, depending upon the pitch and design of the cam slot 12, desired amounts of oscillatory motion may be imparted to the spindle 26 and the number of these oscillations for each rotation of the handle 23 may be varied as desired by changing the number of complete waves formed in the cam slot 12 and it will appear that for any particular construction of the cam slot 12, each rotation of the handle 23 besides imparting to the spindle 26 a number of complete oscillatory movements, also advances or rotates the spindle 26 a certain amount depending upon the pitch of the worm 24, and that continued rotation of the crank 23 slowly rotates the spindle 26 at the same time that it is being oscillated by the cam slot 12 so that the resultant motion of the spindle 26 is one of continuous progression in the same direction of rotation. The motion thus imparted to the spindle 26 is thus well adapted to grind any valve against its seat since the oscillatory motion effectively removes or crushes any particles of carbon that may be between the valve and its seat and effects a better grinding action than if the oscillatory motion were omitted. In practice it is desirable that the movement of the spindle 26 angularly in each direction for each oscillation shall considerably exceed the amount of rotary movement imparted to the spindle for each complete cycle of operation and this result is readily secured by my construction.

The device shown in Fig. 3 is of substantially the same construction as that described above, the only difference being that the sleeve 15ª extending from the casing 10ª is considerably lengthened to contain and support the shaft 14ª which in this case is also considerably lengthened so that said shaft may carry a plurality of worms 24ª, 24ª for driving corresponding spindles 26ª, 26ª supported in parallel relation at a distance from each other corresponding with the distance between the valves 32ª, 32ª of the motor or engine with which the device is to be used. The spindles 26ª, 26ª are supported in sleeves 33ª, 33ª carried by the sleeve 15ª in substantially the manner that the spindle 26 above described is supported in the sleeve 33. The spindles 26ª, 26ª are preferably constructed and driven in the manner above described for the spindle 26. With this construction it will be understood that any desired number of spindles may be provided depending upon the particular construction of motor or engine whose valves are to be ground by the device. As indicated in Fig. 1, the sleeve 15ª is slotted longitudinally at 15ᵇ to permit engagement between the shaft 14ª and the worm wheel on the spindle, and the sleeve or housing 33ª is extended around the sleeve 15ª in the form of a clamp, the clamping lugs 33ᵇ of which may be held together by a screw or bolt 34. In this manner, the housing 33ª may be moved on the sleeve 15ª to secure desired spacing between the spindles and other similar housings may be similarly carried by the sleeve 15ª as desired, the shaft 14ª being preferably threaded throughout its length to engage the worm wheels wherever they may be. As shown in Fig. 5, it will be seen that the housing 33ª is provided with a lug or lugs 33ᶜ entering the slot 15ᵇ with a sliding fit when the clamp is released, to prevent collapse of the sleeve 15ª against the shaft 14ª when the screw 34 is turned to clamp the housing 33ª to the sleeve 15ª.

It will be noticed that the worm 24 is at all times in mesh with the worm wheel 25, as a result of which for continuous rotation of the crank 23, the rotation of the worm 24 imparts continuously a rotary motion to the worm wheel 25 relatively to said worm; also that the arm 13 is continuously engaged by the cam slot 12 without the use of delay surfaces in the latter; in the claims I designate said connections as continuous mesh gearing to distinguish from mutilated or intermittent gearing which is not continuously in mesh.

While I have shown my invention in the particular embodiment above described, it will be understood that I do not limit myself to this exact construction as I may employ equivalents known to the art at the time of the filing of this application without departing from the scope of the appended claims.

What I claim is:

1. In a mechanical movement, the combination of a reciprocating shaft, a driven spindle, a driving sleeve, a first arm projecting from said sleeve, a second arm projecting from said shaft and engaged by said first arm, a cam engaging said second arm to reciprocate said shaft upon rotation thereof, and continuous mesh gearing connecting said shaft and spindle whereby rotation of said shaft produces continuous motion of said spindle relatively to said shaft.

2. In a mechanical movement, the combination of a reciprocating shaft, a driven spindle, a driving sleeve, a first arm projecting from said sleeve, a second arm projecting from said shaft and engaged by said first arm, a cam engaging said second arm to reciprocate said shaft upon rotation thereof, and continuous mesh gearing connecting said shaft and spindle whereby rotation of said shaft produces continuous motion of said spindle relatively to said shaft, said gearing comprising a worm on said shaft and a worm wheel on said spindle, said worm and worm wheel being in mesh at all times.

3. In a mechanical movement, the combination of a driving element, a plurality of driven oscillatory spindles, and gearing operatively connecting said element and spindles at all times, a casing for said element and gearing having a projecting stationary sleeve, a housing for one of said spindles movable on said sleeve to different positions relatively to another of said spindles without interrupting the relation of said gearing, a clamp carried by said housing to secure it in desired position on said sleeve, said sleeve being slotted along one side to permit engagement between said spindle and said gearing, and a lug projecting from said housing into said slot to prevent collapse of said sleeve under the action of said clamp.

4. In a mechanical movement, the combination of a casing, a rotary sleeve mounted in said casing and restrained from longitudinal movement therein, and operating handle secured to said sleeve, a shaft supported for longitudinal movement in said sleeve and unrestrained angularly thereby, said casing carrying a closed cam groove surrounding said shaft, a radial arm carried by said shaft engaging said cam groove, a second arm extending longitudinally from said sleeve engaging said radial arm, a worm carried by said shaft, a worm wheel meshing with said worm, and a driven spindle secured to and driven by said worm wheel.

5. In a mechanical movement, the combination of a casing, a rotary sleeve mounted in said casing and restrained from longitudinal movement therein, an operating handle secured to said sleeve, a shaft supported for longitudinal movement in said sleeve and unrestrained angularly thereby, said casing carrying a closed cam groove surrounding said shaft, a radial arm carried by said shaft engaging said cam groove, a second arm extending longitudinally from said sleeve engaging said radial arm, a worm carried by said shaft, a worm wheel meshing with said worm, and a driven spindle secured to and driven by said worm wheel, the angular movement of said spindle due to said cam groove per rotation of said shaft being greater than the angular movement of said spindle due to said worm per rotation of said shaft.

6. In a mechanical movement, the combination of a casing, a shaft mounted for rotary and longitudinal motion in said casing, means for rotating said shaft, said casing carrying a closed cam groove surrounding said shaft, a radial arm carried by said shaft engaging said cam groove, a worm carried by said shaft, a worm wheel meshing with said worm, and a driven spindle secured to and driven by said worm wheel.

7. In a mechanical movement, the combination of a casing, a shaft mounted for rotary and longitudinal motion in said casing, means for rotating said shaft, said casing carrying a closed cam groove surrounding said shaft, a radial arm carried by said shaft engaging said cam groove, a worm carried by said shaft, a worm wheel meshing with said worm, and a driven spindle secured to and driven by said worm wheel, the angular movement of said spindle due to said cam groove per rotation of said shaft being greater than the angular movement of said spindle due to said worm per rotation of said shaft.

In witness whereof, I hereunto subscribe my name this 5th day of April, A. D. 1921.

HARRY A. BERN.